(12) United States Patent
Wüstenhagen et al.

(10) Patent No.: US 9,812,955 B2
(45) Date of Patent: Nov. 7, 2017

(54) METHOD FOR LIMITING THE STARTING CURRENT OF A STEP-UP-CONVERTER

(71) Applicant: BorgWarner Ludwigsburg GmbH, Ludwigsburg (DE)

(72) Inventors: Dirk Wüstenhagen, Auma (DE); Dejan Kienzle, Heilbronn (DE)

(73) Assignee: BorgWarner Ludwigsburg GmbH, Ludwigsburg (DE)

( * ) Notice: Subject to any disclaimer, the term of this patent is extended or adjusted under 35 U.S.C. 154(b) by 0 days.

(21) Appl. No.: 15/265,423

(22) Filed: Sep. 14, 2016

(65) Prior Publication Data
US 2017/0077804 A1   Mar. 16, 2017

(30) Foreign Application Priority Data
Sep. 16, 2015  (DE) .................. 10 2015 115 637

(51) Int. Cl.
| | | |
|---|---|---|
| H02M 3/158 | (2006.01) | |
| H02M 3/07 | (2006.01) | |
| H02M 1/36 | (2007.01) | |

(52) U.S. Cl.
CPC ............. *H02M 3/07* (2013.01); *H02M 1/36* (2013.01); *H02M 3/158* (2013.01)

(58) Field of Classification Search
CPC ........ H02M 3/073; H02M 3/07; H02M 7/103; H02M 1/36; H02M 3/158; G05F 3/205; G11C 5/145
See application file for complete search history.

(56) References Cited

U.S. PATENT DOCUMENTS

| | | | | |
|---|---|---|---|---|
| 2005/0023994 | A1* | 2/2005 | Samejima | H02M 3/158 315/291 |
| 2010/0033014 | A1* | 2/2010 | Mueller | H02M 3/158 307/31 |
| 2014/0009134 | A1 | 1/2014 | Bernardon et al. | |
| 2016/0204693 | A1* | 7/2016 | Mayer | H02M 1/4225 323/205 |

FOREIGN PATENT DOCUMENTS

| | | |
|---|---|---|
| DE | 102 55 431 A1 | 6/2004 |
| JP | 2005-354860 A | 12/2005 |

* cited by examiner

*Primary Examiner* — Long Nguyen
(74) *Attorney, Agent, or Firm* — Bose McKinney & Evans LLP

(57) ABSTRACT

The disclosure relates to a method for limiting the starting current of a step-up-converter that is supplied by a DC voltage source. The step-up converter has a first capacitor, a coil connected in parallel to the first capacitor, a second capacitor connected to the coil in series, and a switch connected to the second capacitor in parallel and connected to the coil in series. In a first step, an output voltage of the circuit is measured and the step-up converter is connected to the DC voltage source by closing a power switch that is connected in series to the first capacitor. In a second step, the power switch is opened upon the output voltage increasing by more than a predefined threshold and is maintained open for a predefined time. The first and second steps are repeated until the output voltage reaches a predefined final value.

5 Claims, 1 Drawing Sheet

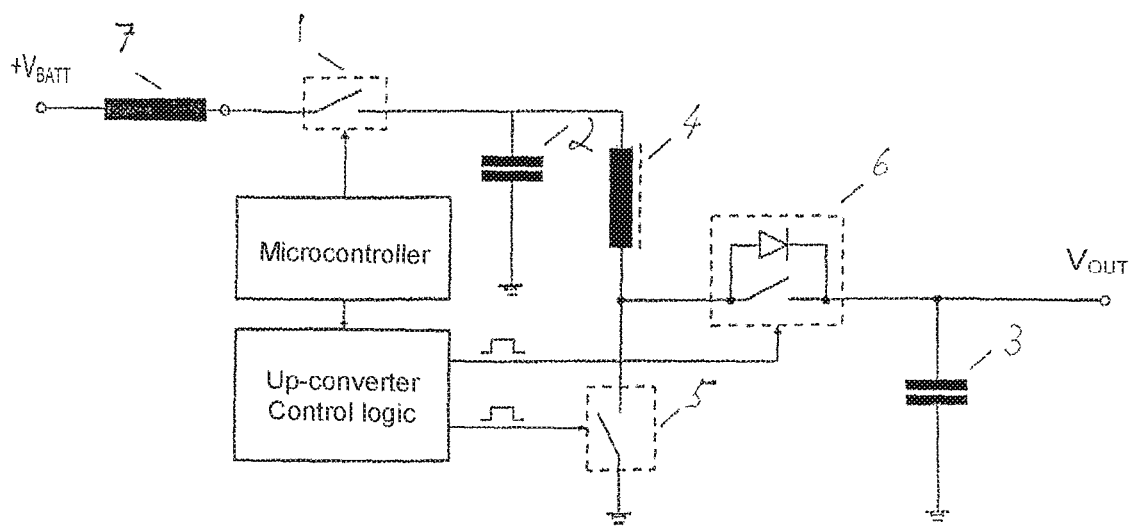

METHOD FOR LIMITING THE STARTING CURRENT OF A STEP-UP-CONVERTER

RELATED APPLICATIONS

This application claims priority to DE 10 2015 115 637.7, filed Sep. 16, 2015, the entire disclosure of which is hereby incorporated herein by reference in its entirety.

BACKGROUND

The invention pertains to a method for limiting the starting current of a step-up-converter.

A method for limiting the starting current of a step-up-converter is generally known from DE 102 55 431 A1. In this known method, the starting current is continuously measured and the step-up-converter is disconnected from a DC voltage source supplying an input voltage of the step-up-converter as soon as the starting current reaches a critical threshold value.

This disclosure teaches a method for limiting the starting current of a step-up-converter to a permissible value with little effort.

According to this disclosure, the output voltage of the voltage converter is monitored and the step-up-converter is temporarily disconnected from the DC voltage source as soon as the output voltage has increased by a predefined value since the last application of the input voltage supplied by the DC voltage source. The step-up-converter is only reconnected to the DC voltage source after a predefined time period, in which the coil of the step-up-converter discharges. As soon as the output voltage has once again increased by the predefined value since the reconnection to the DC voltage source, the DC voltage source is once again disconnected from the step-up-converter such that the coil of the step-up-converter can discharge again. The output voltage of the step-up-converter therefore is incrementally increased by repeatedly switching on and off a power switch, by means of which the step-up-converter is connected to the DC voltage source. This incremental increase of the output voltage is carried out until the output voltage has reached a predefined final value. Once the final value is reached, the power switch can remain closed as long as desired because alarmingly high currents are no longer expected due to the fact that all capacitors of the step-up-converter already have been largely charged.

The predefined final value preferably lies below the input voltage. For example, the final value may amount to three fifths of the input voltage supplied by the DC voltage source or more. The final value is dependent on the system consisting of cable harness, capacitance and permissible maximum current and therefore cannot be generally defined. In many applications, the final value amounts to three fourths of the value of the input voltage supplied by the DC voltage source.

The monitoring of the output voltage of the step-up-converter can be realized with significantly less effort than the direct monitoring of the starting current, in which case a current measurement would be required. Since the increase of the input voltage takes place incrementally, however, a rise of the starting current to problematic values can be prevented just as reliably.

The number of steps, in which the output voltage should be increased to the final value, depends on the degree, to which the starting current should be limited. As a rule, it is advantageous if the threshold value, by which the output voltage is increased in each step, amounts to no more than one tenth of the input voltage supplied by the DC voltage source. However, the threshold value may also be much lower and merely amount, for example, to 5% of the input voltage supplied by the DC voltage source or less.

According to this disclosure, the time period between disconnecting and reconnecting the input voltage can largely be chosen arbitrarily. However, the time period should be sufficiently long for allowing the coil of the step-up-converter to discharge, i.e., for at least largely reducing the current flowing therein. Good results can be achieved if the time period is so long that the charging current of the capacitor of the step-up-converter has settled to less than one tenth, preferably to no more than 5%, of a previously reached maximum value in the closed state of the power switch.

BRIEF DESCRIPTION OF THE DRAWINGS

The above-mentioned aspects of exemplary embodiments will become more apparent and will be better understood by reference to the following description of the embodiments taken in conjunction with the accompanying drawings, wherein:

FIG. 1 shows a schematic circuit diagram of a step-up-converter.

DESCRIPTION

The embodiments described below are not intended to be exhaustive or to limit the invention to the precise forms disclosed in the following detailed description. Rather, the embodiments are chosen and described so that others skilled in the art may appreciate and understand the principles and practices of this disclosure.

FIG. 1 shows a schematic circuit diagram of a step-up-converter that can be connected to a DC voltage source such as, for example, a car battery supplying an input voltage $V_{BATT}$ by means of a power switch 1 that may be realized, e.g., in the form of a reverse polarity protection circuit. An inductance 7 such as, for example, the inductance of a cable harness may be arranged between the DC voltage source and the power switch 1. The step-up-converter contains a coil 4, a capacitor 3 that is connected to the coil 4 in series and a capacitor 2 that is connected to the coil 4 in parallel. A switch 5 is connected to the capacitor 3 in parallel and to the coil 4 in series. A switch 6 and/or a diode such as, for example, a transistor switch with a body diode are arranged parallel to the switch 5 between the coil 4 and the capacitor 6.

The power switch 1 is controlled by a microcontroller that controls the remaining switch or remaining switches 5, 6 by means of a control logic. In order to limit starting currents, the microcontroller carries out the method described below.

The microcontroller 1 detects the output voltage $V_{Out}$ at the capacitor 3 by means of a not-shown sensor and subsequently closes the power switch 1. If the converter was inactive for a lengthy time period, its capacitors 2, 3 are usually discharged such that the output voltage $V_{Out}$ is zero or at least much lower than the input voltage $V_{BATT}$. The microcontroller monitors the output voltage $V_{Out}$ and opens the power switch 1 as soon as the output voltage has increased by a threshold value $\Delta U$. The power switch 1 then remains open for a predefined time period, in which the coil 4 can discharge and the current flowing therein can settle to, for example, one tenth of a maximum value reached in the closed state of the switch or less. After this time period, the output voltage $V_{Out}$ is measured anew and the power switch is closed again until the output voltage has once again increased by the threshold value ΔU. The power switch 1 is then opened again for the predefined time period such that the coil 4 can once again discharge. Subsequently, the power switch 1 is closed again until the output voltage has once again increased by the threshold value ΔU.

This is repeated until it is determined that the output voltage $V_{Out}$ has reached or exceeded a predefined final value when the power switch 1 is closed. If this is the case, the power switch 1 remains closed and the microcontroller activates the control logic, which then cyclically controls the switch 5 and, if applicable, also the switch 6 such that an increased output voltage is generated.

Generally speaking, the microcontroller checks if the output voltage $V_{Out}$ is lower than the final value each time the power switch 1 is closed. If this is the case, the microcontroller opens the power switch 1 as soon as the output voltage has increased by the threshold value ΔU. The microcontroller then closes the power switch again once the predefined time period for allowing the coil 4 to discharge has elapsed.

While exemplary embodiments have been disclosed hereinabove, the present invention is not limited to the disclosed embodiments. Instead, this application is intended to cover any variations, uses, or adaptations of this disclosure using its general principles. Further, this application is intended to cover such departures from the present disclosure as come within known or customary practice in the art to which this invention pertains and which fall within the limits of the appended claims.

LIST OF REFERENCE SYMBOLS

1 Power switch
2 Capacitor
3 Capacitor
4 Coil
5 Switch
6 Switch
7 Inductance

What is claimed is:

1. A method for limiting a starting current of a step-up-converter that is supplied by a DC voltage source, the step-up converter comprising a first capacitor, a coil connected in parallel to the first capacitor, a second capacitor connected to the coil in series, and a switch connected to the second capacitor in parallel and connected to the coil in series, said method comprising:
   a) measuring an output voltage of the step-up converter and connecting the step-up-converter to the DC voltage source by closing a power switch that is connected in series to the first capacitor;
   b) opening the power switch as soon as the output voltage increases by more than a predefined threshold value from the time the power switch was closed, and maintaining the power switch open for a predefined time; and
   c) repeating steps a) and b) until the output voltage reaches a predefined final value.

2. The method according to claim 1, wherein the predefined time period is sufficiently long that the charging current of the second capacitor has settled to less than one tenth of a previously reached maximum value in the closed state of the power switch.

3. The method according to claim 1, wherein the predefined time period is sufficiently long that the charging current of the second capacitor has settled to less than 5% of a previously reached maximum value in the closed state of the power switch.

4. The method according to claim 1, wherein the threshold value is at least one tenth of the input voltage supplied by the DC voltage source.

5. The method according to claim 1, wherein the final value of the output voltage is at least three fifths of the value of an input voltage supplied by the DC voltage source.

* * * * *